(12) United States Patent
Batchu et al.

(10) Patent No.: US 12,455,886 B2
(45) Date of Patent: *Oct. 28, 2025

(54) RECORD MATCHING SYSTEM

(71) Applicant: National Student Clearinghouse, Herndon, VA (US)

(72) Inventors: Ravi Batchu, Sterling, VA (US); Manish Ganotra, Ashburn, VA (US); Diana Gillum, Ashburn, VA (US); Joolee Tao, McLean, VA (US); Steven Truesdale, Round Hill, VA (US)

(73) Assignee: National Student Clearinghouse, Herndon, VA (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/524,924

(22) Filed: Nov. 30, 2023

(65) Prior Publication Data

US 2024/0104101 A1    Mar. 28, 2024

Related U.S. Application Data

(63) Continuation of application No. 17/890,951, filed on Aug. 18, 2022, now Pat. No. 11,886,438, which is a
(Continued)

(51) Int. Cl.
  *G06F 17/30*   (2006.01)
  *G06F 16/215*  (2019.01)
  *G06F 16/2455* (2019.01)

(52) U.S. Cl.
  CPC ...... *G06F 16/24564* (2019.01); *G06F 16/215* (2019.01)

(58) Field of Classification Search
  CPC ........ G06F 16/13; G06F 16/24; G06F 16/156; G06F 3/1297; G06N 3/00; G06N 5/00;
  (Continued)

(56) References Cited

U.S. PATENT DOCUMENTS

| | | | |
|---|---|---|---|
| 6,697,799 B1 * | 2/2004 | Neal | G06F 16/951 706/45 |
| 7,565,337 B2 * | 7/2009 | Huelsman | G06Q 30/06 706/45 |

(Continued)

OTHER PUBLICATIONS

International Search Report & Written Opinion mailed Sep. 25, 2017, issued in International Application No. PCT/US2017/040308.

*Primary Examiner* — Hung D Le
(74) *Attorney, Agent, or Firm* — Blank Rome LLP

(57) ABSTRACT

Methods and systems for an improved Enterprise Matching Service ("EMS") that is designed to match incoming data records to a database of records, using less system resources and using those resources more efficiently. The EMS identifies potential matches by generating unique identifiers and match codes for incoming data records, and then, using a series of sequential matching strategies, matching the unique identifiers and match codes to pre-generated unique identifiers and match codes for database records to identify a subset of potential matches. If no matches are identified, the next matching strategy is executed. Once a subset of potential matches are identified, the methods and systems may weigh the subset of potential matches to determine whether there is a match.

15 Claims, 6 Drawing Sheets

Related U.S. Application Data continuation of application No. 16/739,934, filed on Jan. 10, 2020, now Pat. No. 11,423,030, which is a continuation of application No. 15/593,024, filed on May 11, 2017, now Pat. No. 10,558,669.

(60) Provisional application No. 62/365,858, filed on Jul. 22, 2016.

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | |
|---|---|---|---|
| 7,899,796 B1* | 3/2011 | Borthwick | G06F 16/24556 707/692 |
| 8,924,329 B2* | 12/2014 | Lin | G06F 9/453 706/45 |
| 2009/0193046 A1* | 7/2009 | Desai | G06F 16/221 |
| 2012/0215802 A1* | 8/2012 | Breeds | G06F 16/93 707/758 |
| 2012/0310864 A1* | 12/2012 | Chakraborty | G06V 10/776 706/12 |
| 2013/0124525 A1* | 5/2013 | Anderson | G06F 16/278 707/737 |
| 2014/0040313 A1* | 2/2014 | Shami | G06F 16/215 707/E17.014 |
| 2014/0052688 A1* | 2/2014 | Bansal | G06N 7/02 706/52 |
| 2014/0281729 A1* | 9/2014 | Goldenberg | G06F 11/0769 714/37 |
| 2015/0193511 A1* | 7/2015 | Woody | G06F 16/248 707/722 |
| 2015/0332165 A1* | 11/2015 | Mermoud | H04L 43/08 706/12 |
| 2016/0055301 A1* | 2/2016 | Turi-Cunningham | G16H 10/60 705/3 |
| 2018/0004976 A1 | 1/2018 | Davis et al. | |
| 2022/0309084 A1* | 9/2022 | Bremer | G06F 16/334 |
| 2024/0020479 A1* | 1/2024 | Singh | G06F 40/284 |
| 2024/0203546 A1* | 6/2024 | Sragow | G06Q 30/0609 |
| 2024/0220452 A1* | 7/2024 | Surkov | G06F 16/13 |

\* cited by examiner

RECORD MATCHING SYSTEM

CROSS REFERENCE TO RELATED APPLICATIONS

This application is a continuation of U.S. patent application Ser. No. 17/890,951, filed Aug. 18, 2022, which is a continuation of U.S. patent application Ser. No. 16/739,934, filed Jan. 10, 2020, and issued U.S. Pat. No. 11,423,030 on Aug. 23, 2022, which is a continuation of U.S. patent application Ser. No. 15/593,024, filed May 11, 2017, and issued as U.S. Pat. No. 10,558,669 on Feb. 11, 2020, which claims the benefit of U.S. Provisional Patent Application No. 62/365,858, filed Jul. 22, 2016, the disclosures of each of which are hereby incorporated by reference in their entirety.

FIELD OF THE INVENTION

The present disclosure relates to data processing, and in particular, a system, database and method for record matching.

BACKGROUND OF THE INVENTION

Record matching, also referred to as "data matching," "record linkage," or "special purpose grouping," generally relates to the task of finding database records stored in a data warehouse that refer to the same individual or entity. These database records may come from different data sources (e.g., different entities supplying records, different types of records supplied, etc.), or may be variations within a data source (e.g., different data entry protocols, different data cleansing protocols, etc.).

Data warehouses are used in a wide range of applications to store large volumes of data records. For example, data warehouses can be used to store large volumes of credit card user data, credit score data, education data, healthcare data, business credential data, or any other application that may utilize record matching. The data records stored in the data warehouses may include a number of attributes that can be used to match the data record with a specific entity or individual.

Frequently, a data warehouse will receive new data from one or more sources. When new data is received, it needs to be merged into the database. If the new data received is not associated with any entity or individual that has a record in the database, then the new data will be added into the database as a new record. If the new data is associated with an entity or individual that already has one or more records stored in the data warehouse, then the new data should be associated with the existing record or records for that individual. This is the role of record matching.

Presently, record matching is generally performed in one of two ways. The first is that when the data arrives, it is cleansed. A clean copy of the data is stored in a data warehouse with a golden record identified. A golden record is the cleanest copy of the merged information of the data set. Once data is cleansed, as incoming data arrives, that data is also cleansed and then matched using predefined algorithms. These algorithms can include exact matching algorithms, Taro-Winkler algorithms, or distance measuring algorithms.

The first option has certain disadvantages. It requires significant data manipulation by cleansing and updating/merging the data into the database. This is problematic because the data that must be manipulated may be owned by another entity. In this case, a matching service may not have permission to manipulate the data, or may even be prohibited by law from manipulating the data. If data manipulation were permitted, then issues regarding data integrity, for example ensuring no important data is lost during the manipulation, may arise.

The second option is to perform matching of several elements of the data and, depending on the results, match additional elements. This option involves comparing a number of elements to the entire database of records, which may include hundreds of millions of records. This technique is computationally intensive and requires significant processing power and time. Though it works well for matching one record, it becomes time consuming and costly to match large amounts of data to a large data set.

Thus, a need exists for a record matching method and system that significantly improves server efficiency for batch record matching, without sacrificing accuracy and without the need to manipulate data records stored in data warehouses.

BRIEF SUMMARY OF THE INVENTION

The present disclosure is directed to methods and systems for an improved Enterprise Matching Service ("EMS") that is designed to match batches in large-scale applications using less system resources, and using those resources more efficiently. The EMS identifies potential matches using the least CPU-intensive activities by generating unique identifiers and match codes for incoming data records, and then matching the unique identifiers and match codes to pre-generated unique identifiers and match codes for database records. Various match sensitivities are embedded in the pre-generated match codes, so an extensive match is handled by a simplistic "one to one" match between match codes in order to identify a subset of potential matches. Once a subset of potential matches are identified, a detailed "sanity check" is performed to confirm a match. The "sanity check" or "weightage node" is a detailed comparison on a selective data subset of potential matches.

Additionally, the EMS is flexible and can be used in a wide range of applications. It can accommodate different matching algorithms for different purposes, and can include different sensitivities or compare different attributes. As end results are interpreted, the "sanity check" or "weightage node" can be tuned, if needed, in order to continually improve upon the accuracy of the results.

DETAILED DESCRIPTION OF THE INVENTION

In the following detailed description, reference is made to the accompanying drawings, which form a part hereof and show by way of illustration specific embodiments of the present invention. These embodiments are described in sufficient detail to enable those skilled in the art to practice them, and it is to be understood that other embodiments may be utilized, and that logical, and processing changes may be made.

Figure 1:
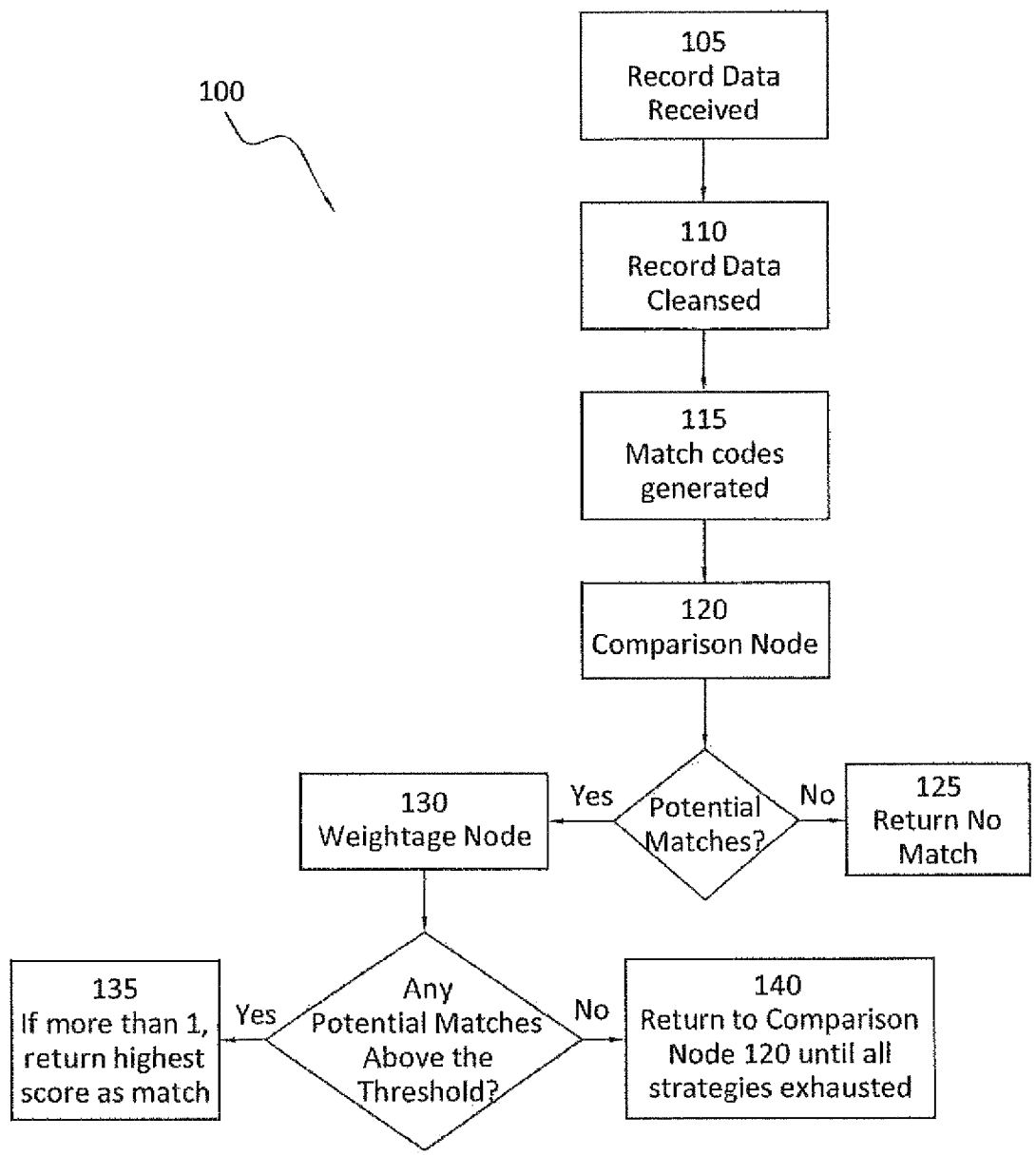
FIG. 1 is a high-level flow chart of a method of record matching, according to an embodiment.

FIG. 1 illustrates a high-level flow chart of a computer-implemented method 100 of batch record matching according to an embodiment.

Incoming data records are received 105 by a first server having a processor and a storage device. The received data records may contain a number of attributes that can be used to associate the data records with a specific entity or individual. For example, the incoming data records can include one or more of: name, address, social security number, school ID number, driver's license number, date of birth, or any other suitable attribute.

Incoming data records may be stored in a request table. The request table is configured to store any number of records, for example ranging from one record to multiple millions of records, depending on the needs of a customer. A customer may choose larger batch sizes to meet its specific needs, while another customer may choose smaller batch sizes. After the request table is populated, the number of records in the table is calculated. The records in the table are then batch-processed by the first server. By utilizing a request table, the computer-implemented method 100 can ensure that record matching will typically be done in a large-volume batch, which provides performance benefits. The first server can utilize the calculated number of records to calculate statistics on the request table to ensure that the computer-implemented method is most efficient.

The data records are then cleansed 110 according to methods known in the art. For example, the incoming record can be cleansed using a Java language program. The Java language program can be installed on the first server or on a second server. In an exemplary embodiment, the second server can be an SAS DataFlux® (distributed by SAS Institute, Inc.) server. Cleansing rules can be customized depending on the application and the attributes being cleansed. In an exemplary embodiment, social security data elements can be cleansed according to the following rules: return null for any social security number that includes one or more of the following: the social security number has one or more non-numeric characters; the trimmed length is not equal to nine characters; all digits are the same; the first digit is a nine; the value is '123456789'; any segment is all 0's; or the first three digits are '666'. Other conditions may additionally be included. Furthermore, one or more of the aforementioned conditions may be removed.

The cleansing rules can be unique for each attribute. In an exemplary embodiment, a first name attribute can be cleansed according to the following rules: 'NFN' is treated as null (not case sensitive); N/A is treated as null (not case sensitive); a series of sequential periods . . . ' is treated as null; if a series of periods is preceded or followed by a name, the matching engine will ignore the periods; numerical values are treated as null; and alphanumeric values are treated as null.

A middle name attribute can be cleansed according to the following rules: 'NMN' is treated as null (not case sensitive); 'N/A' is treated as null (not case sensitive); numerical values are treated as null; and alphanumeric values are treated as null.

A last name attribute can be cleansed according to the following rules: 'NLN' is treated as null (not case sensitive); N/A is treated as null (not case sensitive); a series of sequential periods . . . ' is treated as null; if a series of periods is preceded or followed by a name, the matching engine will ignore the periods; numerical values are treated as null; and alphanumeric values are treated as null.

Other data attributes can be cleansed according to rules suitable for that attribute.

After cleansing the incoming data records, match codes may be generated 115 according to methods known in the art. For example, the second server may be used to generate match codes for some or all of the available data attributes. The match codes may be generated by performing several steps, for example by parsing the input character value to identify tokens, removing insignificant vowels, removing some words, and standardizing the format and capitalization of words. The match code extracts an appropriate amount of information from one or more of the cleansed attributes, and can take into consideration a specified locale, a match definition, and a level of sensitivity. Other methods known in the art for generating match codes may alternatively be used.

The specified locale identifies the language and geographical region of the incoming data records. For example, the locale ENUSA specifies that the incoming data records use the English language as it is used in the United States.

A match definition can be configured to identify a data attribute, and then determine what constitutes a match. For example, match definitions can be Name, Address, Date of Birth, Organization, Social Security Number, Student College ID, or any other suitable match definition.

The sensitivity can be configured according to the desired application. For example, the sensitivity can be a value between 50 and 95 that determines the amount of information that is captured in the match code. Lower sensitivities capture less information in the match code, and therefore return more potential matches than higher sensitivities. The lower sensitivities employ fuzzy logic-based partial matching to increase the potential match pool.

In an exemplary embodiment, a received data record is a student data record that may include the following attributes: social security number; student ID number; student profile token; first name; last name; date of birth; middle name or initial; address; and school code. In other embodiments, the incoming data record can include any combination of the aforementioned attributes. Any other suitable attributes be also be included in the incoming data record. In other embodiments, the incoming data record may be something other than a student data record. For example, the incoming data record may be a credit card customer record, a healthcare record, an employee record, a veteran record, a commercial enrollment verification record, or any other record that must be compared to a database.

Continuing with the exemplary embodiment described above, one or more match codes are generated 115 by the second server for each incoming data record. The match codes can include one or more of the following: full name match code with sensitivity at 95 (full name MC95); full name match code with sensitivity at 85 (full name MC85); full name swap match code with sensitivity at 85 (full name swap MC85-FN/MN swap); full name swap match code with sensitivity at 85 (full name swap MC85-FN/LN swap); previous full name match code with sensitivity at 85 (previous full name MC85); date of birth match code with sensitivity at 95 (DOB MC95); date of birth match code with sensitivity at 75 (DOB MC75); first name match code with sensitivity at 85 (FN MC85); first name match code with sensitivity 65 (FN MC65); middle name match code with sensitivity at 85 (MN MC 85); middle name match code with sensitivity at 65 (MN MC 65); last name match code with sensitivity at 85 (LN MC 85), last name match code with sensitivity at 65 (LN MC 65), and address match code with sensitivity at 85 (address MC85).

If the cleansed data includes null attributes for first name or last name, then no match code is generated for the first name or last name. If the date of birth is null, then no date of birth match code is generated.

Figure 2:
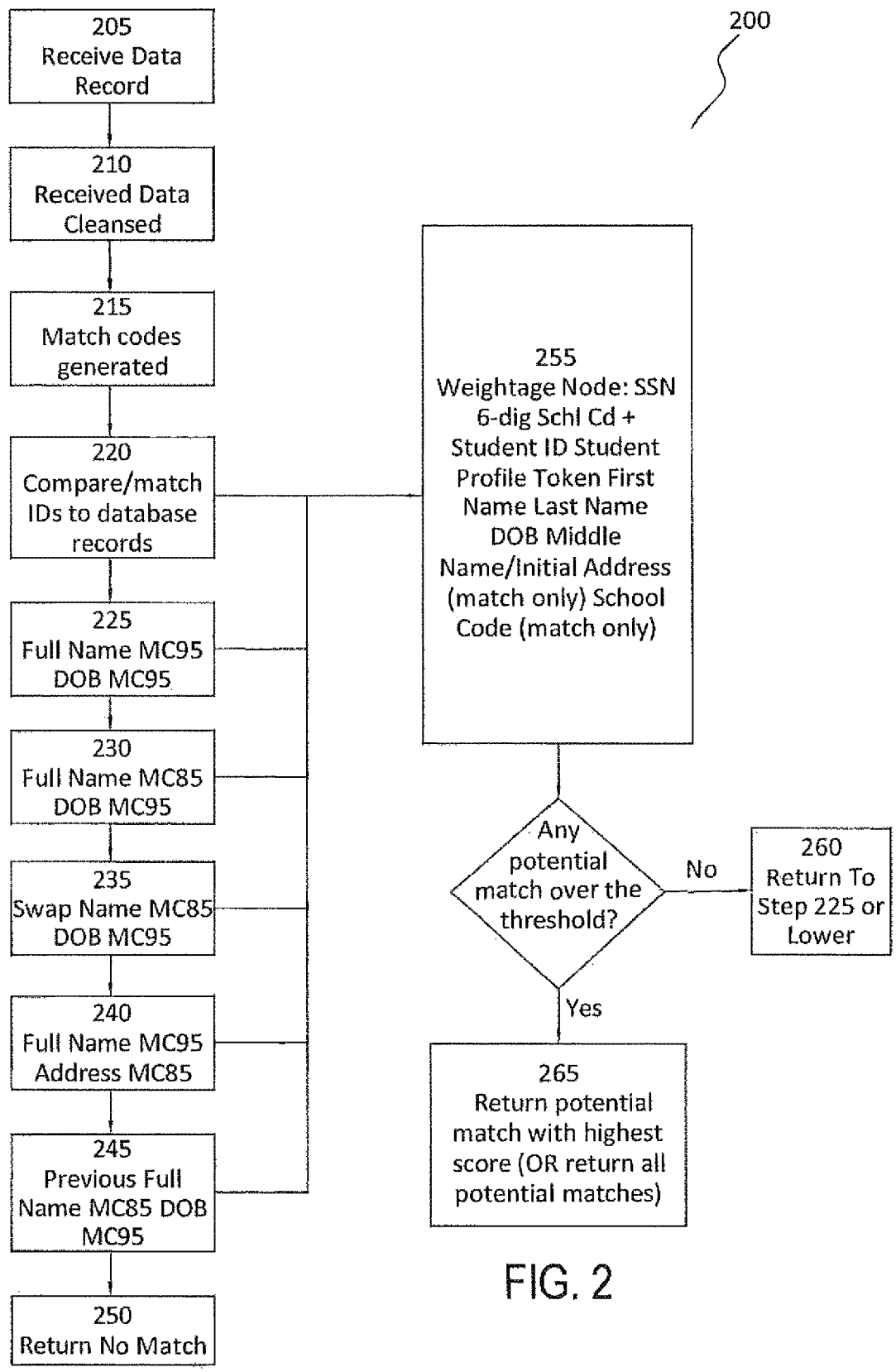
FIG. 2 is a more detailed version of the flow chart of FIG. 1, according to an embodiment.

Once the match codes are generated, a comparison node 120 of the computer-implemented method, particularly the processor of the first server, compares the generated match codes to a data warehouse containing database records. The comparison node may include a series of sequential matching strategies. These strategies compare the identifiers and the generated match codes to the database in order to identify a subset of potential matches. The sequential matching strategies allows the system and method to compare single values (an identifier such as a social security number, or a match code or codes) to an entire database, instead of comparing each attribute to the entire database. FIG. 2 illustrates an example embodiment of a computer-implemented method 200 having a series of six sequential matching strategies 220, 225, 230, 235, 240, 245. If no potential matches are identified using a first matching strategy, then the method proceeds to a next matching strategy. The method continues to proceed through sequential matching strategies until at least one potential match is identified and meets the weightage node requirements, or no potential matches are identified and no more matching strategies remain. When at least one potential match is identified, the method proceeds to a weightage node 255, described in more detail below. If none of the potential matches meet the requirements of the weightage node, then the method proceeds to the next matching strategy. The sequential matching strategies allow potential matches for a received record to be identified quicker and using less system resources than previous matching techniques known in the art.

The six sequential search strategies illustrated in the example embodiment of FIG. 2 are: ID (node 1); full name MC95 DOB MC95 (node 2); full name MC85 DOB MC95 (node 3); swap name MC85 DOB MC95 (node 4); full name MC95 address MC85 (node 5); and previous full name MC85 DOB MC95 (node 6). If no potential matches are identified by comparing the ID (node 1) to the database records, or if a potential match is identified but it does not pass the weightage node, then the method proceeds to compare the full name MC95 and DOB MC95 (node 2) to the database records. If still no potential matches are identified or a potential match is identified but it does not pass the weightage node, then the method proceeds to compare the full name MC85 and DOB MC95 (node 3) to the database records, and so on until at least one potential match is identified, or no matches are identified and no more search strategies remain. In this event, the output of the method is no match exists. In an example embodiment, the method can create a new record when no match exists. In another embodiment, the method can present a user with the option of creating a new record. In yet another embodiment, the method simply informs a user that no match exists.

Node 1 compares a first match code, which corresponds to a ID code, to the entire database. Records contained within the data warehouse already have ID codes associated with each record. Thus, node 1 compares a single attribute (ID code) to ID codes in the database. If one or more potential matches are returned, then the method proceeds to a weightage 255 node to compare the received record attributes to the potential matches. No other search strategies are used unless none of the potential matches meet the requirements of the weightage node 255. If no potential matches are returned or no potential matches meet the requirements of the weightage node 255, then the method proceeds to the next search strategy, node 2.

The ID code can correspond to a current social security number, a previous social security number, or a six-digit school code plus a student ID number. The ID codes of the database records can also correspond to any of these. The method compares the ID code of the received record to the IDs of the database records to determine whether there are any potential matches.

Node 2 compares a second match code, which corresponds to the full name MC95 and the DOB MC95, to the database records. If one or more potential matches are returned, then the method proceeds to a weightage 255 node to compare the received record attributes to the potential matches. If no potential matches are returned, then the system proceeds to the next search strategy at node 3.

Node 3 compares a third match code, which corresponds to the full name MC85 and the DOB MC95, to the database records. If one or more potential matches are returned, then the method proceeds to a weightage 255 node to compare the received record attributes to the potential matches. If no potential matches are returned, then the system proceeds to the next search strategy at node 4.

Node 4 compares a fourth match code, which corresponds to the swap name MC85 and the DOB MC95, to the database records. If one or more potential matches are returned, then the method proceeds to a weightage 255 node to compare the received record attributes to the potential matches. If no potential matches are returned, then the system proceeds to the next search strategy at node 5.

Node 5 compares a fifth match code, which corresponds to the full name MC95 and the address MC85, to the database records. If one or more potential matches are returned, then the method proceeds to a weightage 255 node to compare the received record attributes to the potential matches. If no potential matches are returned, then the system proceeds to the next search strategy at node 6.

Node 6 compares a sixth match code, which corresponds to the previous full name MC85 and the DOB MC95, to the database records. If one or more potential matches are returned, then the method proceeds to a weightage 255 node to compare the received record attributes to the potential matches. If no potential matches are returned, then the method has no more search strategies to proceed to, and produces an output of no match.

It is understood that a person of ordinary skill in the art could customize the nodes for a specific application. For example, in a health care application, an attribute of the received record may be appointment dates or surgery dates. The method could then be configured to include one or more of these dates in the matching strategy. Many other examples of possible applications are evidence in the fields of banking, credit scoring, credit cards, and business credentials. It is further understood that a person of ordinary skill in the art could utilize a different configuration of hardware components without departing from the spirit or scope of the invention. For example, the method described above may be implemented on one, two, three, four, or more servers, depending on where the data warehouses are physically located, who owns the data stored in the data warehouses, what cleansing operations are desired, etc.

By proceeding through the matching strategies one attribute or match code at a time, many of the incoming data records have one or more potential matches identified early in the process.

If one or more potential matches are identified, the method proceeds to the weightage node 255. The weightage node compares the received record to the potential matches identified by the searching strategy nodes. In one embodiment, the weightage node can consist of three attribute categories: identifiers, primary, and secondary. Each category can include one or more attributes. In an exemplified embodiment, the identifier category can include attributes for a social security number, a previous social security number, a six-digit school code plus a student ID number, and a student profile token. A match on any of these attributes can return a weighted value. A mismatch can return a negative number. For example, a match can return a value of +4, while a mismatch can return a value of −2. A match or mismatch decision may be made on each attribute, resulting in a possibility of three combined matches and mismatches. If the received record has a value of null for any of the attributes, no comparison for that attribute is made and the score of the record is not impacted.

The primary category can include first name, last name, and date of birth. A match on any of these three attributes returns a score of +2, while a mismatch returns a score of −1. A match or mismatch decision may be made on each attribute, resulting in a possibility of three combined matches and mismatches.

The secondary category can include middle name or initial, address, and school code. A match on any of these three attributes returns a score of +1, while a mismatch returns a score of −0.5. In an alternative embodiment, a mismatch on address or school code does not return a negative score. Instead, only a match counts towards the score. Therefore, three matches may be possible in the secondary category of this embodiment, while only one mismatch is possible. Table 1 illustrates an exemplary embodiment of a scoring system used in the weightage node:

TABLE 1

| Identifiers | | Primary | | Secondary | |
| --- | --- | --- | --- | --- | --- |
| SSN | | First Name | | Middle Name/Initial | |
| Student ID plus school code | | Last Name | | Address (match only) | |
| Student Profile Token | | Date of Birth | | School code (match only) | |
| Match | Mismatch | Match | Mismatch | Match | Mismatch |
| +4 | −2 | +2 | −1 | +1 | −0.5 |

The method may be configured to return a match when the scores of the weightage node add up to a threshold value. Any suitable threshold value may be selected. For example, assuming the scoring system of table 1 is used, a suitable threshold value may be 5.5, 6, 6.5, 7, or any other value that results in accurate matching. Furthermore, it is understood that a person of ordinary skill in the art could scale these numbers or make adjustments depending on the application, without departing from the teachings of this disclosure. If no database records meet or exceed the threshold value, then the method returns no matches. If multiple records exceed the threshold value, then the method can be configured to return all of such records as matches, or return the highest-scored record as the match. If there is a tie for the highest score, then the method may flag the records for later inspection. The method may similarly flag for later inspection all records exceeding the threshold value. If a set of potential matches are identified during one of the searching strategies or nodes, but none of the potential matches exceed the threshold value, then the method returns to the next searching strategy or node until all have been exhausted.

In another embodiment, the method does not itself sum the scores of the matches and mismatches. Instead, a table of all valid possible combinations with their associated match scores are pre-calculated and stored in a Byte code reference table on the first or second server. A flag is set of unique combinations of Match or no Match. At run time, a unique combination of matches is identified for each record. The combination is in the form of a byte code that is compared with the reference table. The reference table provides granular control of considering any combination as match or not a match. In this embodiment, a threshold is used initially to generate the reference code table, but after the table is generated, a granular control (specifying certain combinations as match or no match) is possible by simply revising a table entry. Therefore, a match score of 5 or 5.5 can be marked as a match and one with score of 6.5 or 7 can be marked as no match if desired. This allows for problematic combinations to be addressed individually without having to revise scoring/weightage values or threshold values for the entire method.

The comparisons between the match codes and the database records can vary depending on the desired application. The following matching guidelines provide an exemplary embodiment of how the comparison nodes determine whether there is a potential match. These examples are not intended to limit the scope of the disclosure and are for illustrative purposes only:

SSN:
    Match: Source(SSN)=Target(SSN)
    OR Source(SSN)=Target(Previous SSN)
    OR Source(Prev SSN)=Target(SSN)
    OR Source(Prev SSN)=Target(Previous SSN)
    Mismatch: Source(SSN 8 out of 9)< >Target(SSN 8 out of 9)|
    AND Source(SSN 8 out of 9)< >Target(Previous SSN 8 out of 9)
    AND Source(Prev SSN 8 out of 9)< >Target(SSN 8 out of 9)
    AND Source(Prev SSN 8 out of 9)< >Target(Prev SSN 8 out of 9)
    Note: the position of the 8 out of 9 digits must be the same Student ID (if 6-Digit School Code Matches):
    Match: Source(Student ID)=Target(Student ID)
    Mismatch: Source(Student ID)< >Target(Student ID)

Stprofil Token (Only Available for Level 2 Matching):
    Match: Source(Stprofil token)=Target(Stprofil token)
    Mismatch: Source(Stprofil token)< >Target(Stprofil token)

FN:
    Match: If Source FN AND Source Prev FN is null, then 0
    ELSE
    Source(FN MC85)=Target(FN MC85)
    OR Source(FN MC85)=Target(MN MC85) if target is middle name
    OR Source(FN MC85)=Target(LN MC85)
    OR Source(FN MC85)=Target(Prev FN MC85)
    OR Source(Prev FN MC85)=Target(Prev FN MC85)
    OR Source(Prev FN MC85)=Target(FN MC85)
    OR Source(Full name MC85)=Target(Full name MC85)
    OR Source(Prev full name MC85)=Target(Full name MC85)

OR Source(Full name MC85)=Target(Prev full name MC85)
OR Source(Prev full name MC85)=Target(Prev full name MC85)
OR Source(Swap name MC 85-FN/LN swap)=Target (Full name MC85)
Mismatch: (If Source FN AND Source Prev FN is null OR If Target FN and Target Prev FN is null) then 0
ELSE
Source(FN MC65)< >Target(FN MC65)
AND Source(FN MC65)< >Target(MN MC65) if target is middle name
AND Source(FN 1st char)< >Target(MI) if target is middle initial
AND Source(FN MC65)< >Target(LN MC65)
AND Source(FN MC65)< >Target(Prev FN MC65)
AND Source(Prev FN MC65)< >Target(Prev FN MC65)
AND Source(Prev FN MC65)< >Target(FN MC65)
AND Source(Full Name MC65)< >Target(Full Name MC65)
AND Source(Prev Full Name MC65)< >Target(Full Name MC65)
AND Source(Full Name MC65)< >Target(Prev Full Name MC65)
AND Source(Prev Full Name MC65)< >Target(Prev Full Name MC65)

LN:
Match: If Source LN AND Source Prev LN is null, then 0
ELSE
Source(LN MC85)=Target(FN MC85)
OR Source(LN MC85)=Target(MN MC85) if target is middle name
OR Source(LN MC85)=Target(LN MC85)
OR Source(LN MC85)=Target(Prev LN MC85)
OR Source(Prev LN MC85)=Target(Prev LN MC85)
OR Source(Prev LN MC85)=Target(LN MC85)
OR Source(Full Name MC85)=Target(Full Name MC85)
OR Source(Prev Full Name MC85)=Target(Full Name MC85)
OR Source(Full Name MC85)=Target(Prev Full Name MC85)
OR Source(Prev Full Name MC85)=Target(Prev Full Name MC85)
OR Source(Swap name MC 85-FN/LN swap)=Target (Full name MC85)
Mismatch: (If Source LN AND Source Prev LN is null OR If Target LN and Target Prev LN is null) then 0
ELSE
Source(LN MC65)< >Target(FN MC65)
AND Source(LN MC65)< >Target(MN MC65) if target is middle name
AND Source(LN 1st char)< >Target(MI) if target is middle initial
AND Source(LN MC65)< >Target(LN MC65)
AND Source(LN MC65)< >Target(Prev LN MC65)
AND Source(Prev LN MC65)< >Target(Prev LN MC65)
AND Source(Prev LN MC65)< >Target(LN MC65)
AND Source(Full Name MC65)< >Target(Full Name MC65)
AND Source(Prev Full Name MC65)< >Target(Full Name MC65)
AND Source(Full Name MC65)< >Target(Prev Full Name MC65)
AND Source(Prev Full Name MC65)< >Target(Prev Full Name MC65)

DOB:
Match: Source(DOB MC95)=Target(DOB MC95)
Mismatch: Source(DOB MC75)< >Target(DOB MC75)
Middle Name/Initial (parsed as first name):
Match: Source(MN MC65)=Target(FN MC65) if source is middle name
OR Source(MN MC65)=Target(MN MC65) if src, tgt middle name
OR Source(MN MC65)=Target(LN MC65) if source is middle name
OR Source(MI)=Target(MI) if src & tgt are middle initial
OR Source(MN 1st char)=tgt middle initial if source is middle name, tgt is middle initial
OR Source(MI)=tgt (MN 1st char) if source is middle initial, tgt is middle name
Mismatch: Source(MN MC65)< >Target(FN MC65) if src is middle name
AND Source(MN MC65)< >Target(MN MC65) if src, tgt middle name
AND Source(MN MC65)< >Target(LN MC65) if src is middle name
AND Source(MI)< >Target(FN 1st char) if source is middle initial
AND Source(MI)< >Target(MN 1st char) if source is middle initial
AND Source(MI)< >Target(LN 1st char) if source is middle initial
AND Source(MN 1st char)< >Target(MI) if src is middle name & tgt is middle initial Address:
Match: Source(Address MC85)=Target(Address MC85)
Mismatch: None School Code (Only if Student Id is not Already a Match):
Match: Source(6-digit school code)=Target(6-digit school code)
Note: School code is a match only when student id is not already a match and source
school code=target school code
Examples: If Student ID is a match, do not match for school code
If Student ID is a mismatch, CAN match for school code
If Student ID is neither a match nor mismatch, CAN match for school code
Mismatch: None The methods and systems of the present disclosure significantly increase the efficiency of performing batch record matching over the prior art batch record matching systems. The prior art systems process requests one at a time in an asynchronous manner. The prior art systems are therefore unable to scale up to high volumes of data. By batch matching a large volume of records, the EMS of the present disclosure resolves the bottle neck. Furthermore, the number of trips to the data warehouse is minimized.

Database caching is also utilized. Covered indexes are created on reference tables to optimize the queries. Repeated usage of the same indexes results in caching the indexes. Hash partitions are created on the most frequently used EMS request tables for quicker and targeted table access. The most frequently used request details table is entirely cached in memory, eliminating the need for a lot of physical input/output and improved processing speed.

The searching strategies that return potential matches significantly reduces the amount of data that must be compared to the entire data warehouse. Only a few generated match codes need to be compared to the pre-generated match codes of the records in the entire data warehouse.

Then a small set of potential matches is evaluated in more detail. Previously, most or all attributes would be compared to the entire data warehouse, requiring considerably more processing power and time. Furthermore, a byte code and combination code is generated that summarizes over 65,000 possible combinations to one number value. Comparing the number value for the byte code and the combination code at run time with a pre-generated reference table enhances the performance by utilizing significantly less CPU power. Table 2, illustrated below, displays an example of the efficiency gains made by the EMS of the present disclosure over known prior art techniques, for example the prior art described in U.S. Pat. No. 8,676,823, assigned to National Student Clearinghouse. This example is not intended to limit the scope of the disclosure and is for illustrative purposes only:

TABLE 2

| Attributes | Existing Matching Engine (Prior Art) | New Matching Service (EMS) |
| --- | --- | --- |
| BATCH_ID | 345 | 600 |
| BATCH_TOTAL | 200000 | 200000 |
| ELAPSED_MINUTES | 91 | 12 |
| RECS_PER_SECOND | 36 | 270 |
| SINGLE_MATCH_CNT | 144285 | 145227 |
| NO_MATCH_CNT | 55656 | 54773 |
| MULTIPLE_MATCH_CNT | 58 | --NA-- |
| MATCH_PERCENT | 72.1425 | 72.6 |
| NO_MATCH_PERCENT | 27.828 | 27.3 |
| Multiple Match Percent | 0.029 | --NA-- |

As illustrated in Table 2, the EMS of the present disclosure batch matched 200,000 records more than seven times faster than the prior art matching engine described in U.S. Pat. No. 8,676,823 and assigned to National Student Clearinghouse. Furthermore, the EMS of the present disclosure is more accurate. The MULTIPLE_MATCH_CNT row, which corresponds to the number of incoming records that the matching engine identified as matching multiple different records, illustrates that the EMS of the present disclosure returned no multiple matches, whereas the prior art matching engine returned fifty-eight records as having multiple matches.

In another embodiment, the method and system may be utilized to de-duplicate (de-dupe) records already stored in a database. In this embodiment, it is presumed that records have already been received, cleansed, and match codes generated.

According to the de-dupe embodiment, a subset of records from the database can be selected and stored in a request table, similar to the method and system described above. After the request table is populated, the number of records in the table is calculated. The records in the table are then batch-processed.

Next, the method and system proceeds to a comparison node 120, as described above. In an exemplary embodiment, the processor of a first server compares the match codes to a data warehouse containing database records. The comparison node may include a series of sequential matching strategies as described in the embodiments above. These strategies compare the identifiers and the match codes to the database in order to identify a subset of potential matches. The sequential matching strategies allows the system and method to compare single values (an identifier such as a social security number, or a match code or codes) to the entire database, instead of comparing each attribute to the entire database. The computational load associated with performing this comparison is thus significantly reduced, allowing for increased efficiency.

The de-dupe embodiment may utilize the matching strategies illustrated in FIG. 2, for example the series of six sequential matching strategies 220, 225, 230, 235, 240, 245. If no potential matches are identified using a first matching strategy, then the method and system proceeds to a next matching strategy. The method and system continues to proceed through sequential matching strategies until at least one potential match is identified and meets the weightage node requirements, or no potential matches are identified and no more matching strategies remain. When at least one potential match is identified, the method and system proceeds to a weightage node 255, described in more detail below. If none of the potential matches meet the requirements of the weightage node, then the method and system proceeds to the next matching strategy. The sequential matching strategies allow potential matches for a received record to be identified quicker and using less system resources than previous matching techniques known in the art.

The method and system may be configured to return a match when the scores of the weightage node add up to a de-dupe threshold value. Any suitable threshold value may be selected. For example, assuming the scoring system of table 1 is used, a suitable threshold value may be 5.5, 6, 6.5, 7, or any other value that results in accurate matching. Furthermore, it is understood that a person of ordinary skill in the art could scale these numbers or make adjustments depending on the application, without departing from the teachings of this disclosure. If no database records meet or exceed the threshold value, then the method returns no duplicated records. If multiple records exceed the de-dupe threshold value, then the method can be configured to return all of such records as duplicates, or return the highest-scored record as a duplicate. If a duplicate is identified, the method may set a flag on the duplicate records for later inspection. In another embodiment, the method may merge the duplicated records into a single record, or may delete all but one of the duplicate records.

Figure 3:
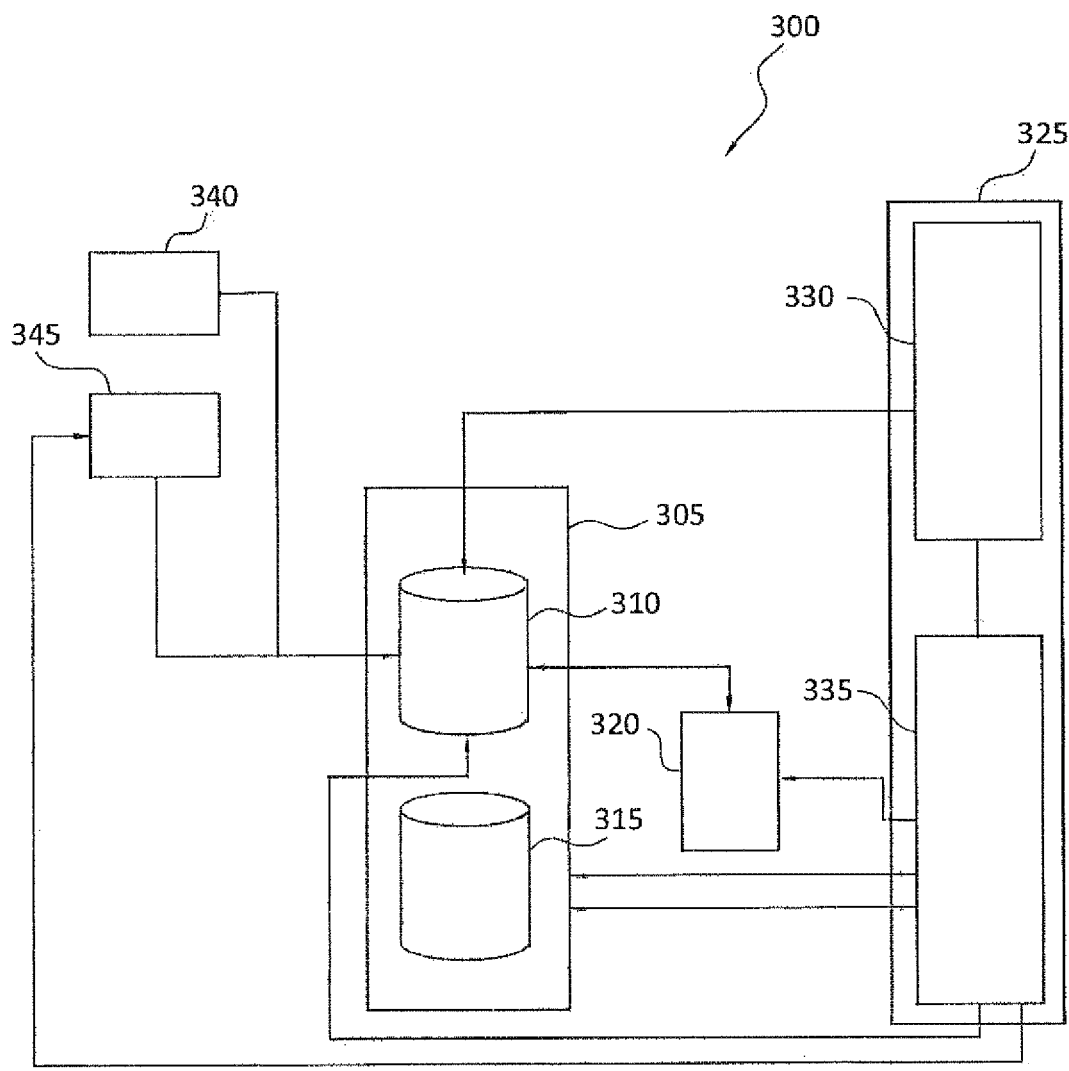
FIG. 3 is a block diagram of a system that implements batch record matching, according to an embodiment.

FIG. 3 is a block diagram of a system 300 that implements batch record matching according to an exemplary embodiment. The system includes a first server 305 comprising an EMS database schema 310 and a data warehouse 315, a second server 320 for cleansing incoming data records and generating match codes, and a third server 325 that contains logically segmented clusters for an enterprise job schedule application 330 and an enterprise matching service job container cluster 335. In the exemplary embodiment of FIG. 3, the first server 305 is an Oracle RAC server (distributed by Oracle Corporation), the second server 320 is a dedicated SAS DataFlux server, and the third server 325 is a WebLogic Server 12c (distributed by Oracle Corporation). The first server 305 has an eight-core CPU per node, 377 GB of RAM per node, and three nodes. The second server 320 has a 4-core, 2.6 MHz CPU and 16 GB of RAM. The third server 325 has 4-core, 2.6 MHz CPU and 24 GB of RAM. In alternative embodiments, the servers may have different hardware specifications without departing from the spirit or scope of the invention. Each of the servers are connected via local area network, the internet, or any other suitable means known in the art.

The system 300 is configured to receive batch requests from customers. In the exemplary embodiment of FIG. 3, one or more customers 340, 345 create batch requests that are received by the first server 305. In alternative embodiments, batch requests can be received by the third server 325.

When a batch request is made, the system 300 places the incoming data records in a request table located in the EMS database schema 310 of the first server 305. The request table can store any number of records, for example ranging from 1 to millions of records, depending on the needs of a customer. A customer may choose larger batch sizes to meet its specific needs, while another customer may choose smaller batches. When the request table is populated, the system 300 begins batch record matching processes. By utilizing a request table, the system can ensure that record matching will typically be done in a large-volume batch, which is when the system 300 is most efficient.

When the request table is populated, the system 300 sends the records in the request table to the second server 320 to be cleansed according to any of the methods described above. In the exemplary embodiment of FIG. 3, the second server utilizes a Java application that performs data cleansing operations. The second server can be a dedicated SAS DataFlux server, but it is understood that other servers may alternatively be used. In alternative embodiments, other methods known in the art may be used to cleanse the records. In these embodiments, the cleansing operations may be carried out on the first or the third server, thus eliminating the need for the second server in FIG. 3.

After the records are cleansed, the second server generates match codes according to any of the methods described above. The match codes may alternatively be generated by the first server 305 or the third server 325. Once the match codes for all of the records in the request table are generated, the system 300 executes matching strategies according to any of the methods described above. In the exemplary embodiment of FIG. 3, the matching strategies are executed by the EMS job container 335 in the third server 325. The efficiency gains described above in Table 2 are realized by, for example, at least one of the first server 305 and the third server 325 due to the significant reduction in computational load and memory needed to perform the matching, as compared to the prior art matching engine. Increased efficiencies are also realized, for example, by processing data records as a batch instead of a single data record at a time.

If any potential matches are identified for a record, the system 300 then calculates a weightage based on scores of the potential matches. As described above, records with scores exceeding a set threshold may then all be output to the customer as matches, or the system 300 may be configured to match the incoming record to the database record with the highest score. If no potential matches are identified during the matching strategies, or none of the potential matches meet the set threshold, then the system 300 outputs no match to the customer.

Figure 4:
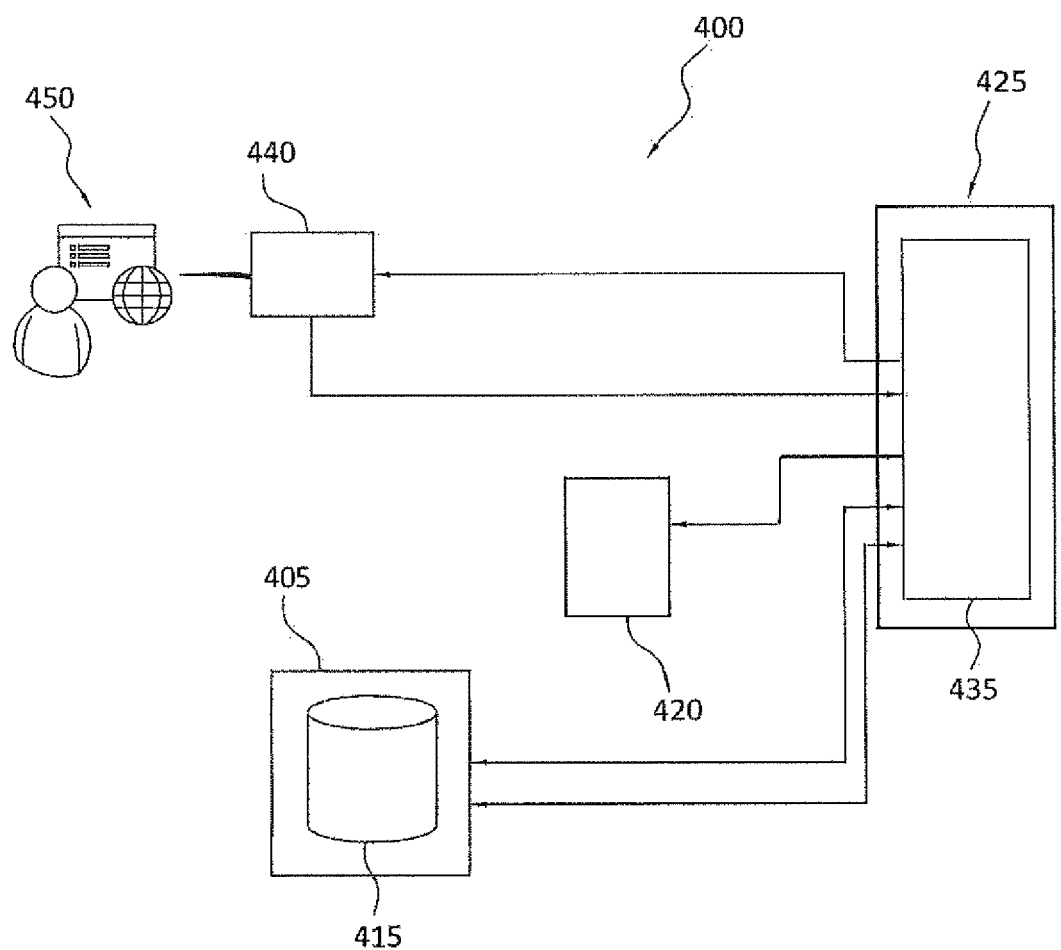
FIG. 4 is a block diagram of a system that implements single record matching, according to an embodiment.

FIG. 4 is a block diagram of a system 400 that implements single record matching, according to an embodiment. The system 400 does not employ the use of a request table and therefore does not perform batch record matching. Instead, a web user sends a request from an electronic device 450 that is connected to a customer portal 440. The system 400 includes a first server 405 that includes a data warehouse 415, a second server 420, for example a dedicated SAS DataFlux server, and a third server 425 that includes a logically segmented EMS cluster 435.

When the customer portal 440 receives a request from a web user, the customer portal 440 transmits the request to the system 400. The third server 425 may be configured to receive the incoming record request, and the second server 420 cleanses the data and generates match codes in accordance with any of the methods described above. The third server 425 then executes matching strategies and weightage scoring according to any of the methods described above. The system 400 then outputs no match, one match, or a plurality of matches to the customer, depending on the results. The efficiency gains described above in Table 2 are realized by, for example, at least one of the first server 405 and the third server 425 due to the significant reduction in computational load and memory needed to perform the matching, as compared to the prior art matching engine.

Figure 5:
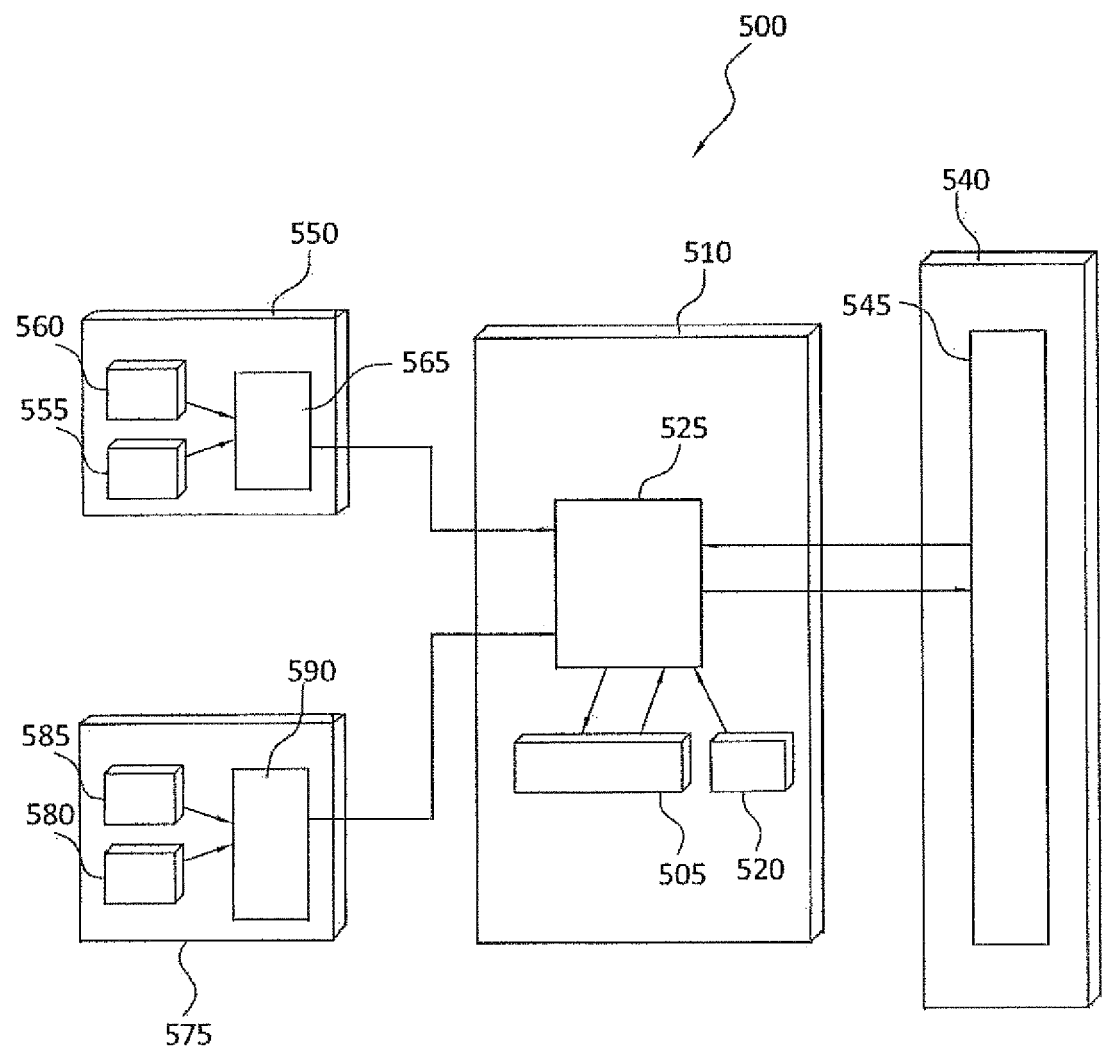
FIG. 5 is a block diagram of a system that implements batch record matching across a plurality of data warehouses, according to an embodiment.

FIG. 5 is a block diagram of a system 500 that implements batch record matching across a plurality of data warehouses, according to an embodiment. In certain states, countries, or provinces, local laws may require that data records stay within the borders of the governmental unit. For example, certain provinces in Canada do not permit certain types of data to be stored outside of the province. In these scenarios, instead of having one data warehouse storing all relevant records for a specific application, there may be multiple data warehouses storing non-overlapping data (and potentially overlapping data as well).

The system 500 may be utilized when encrypted data is permitted to exit the province. Encrypted match codes will be generated for records in data warehouses 555, 585 of each province, and then the encrypted match codes will be sent to a central data warehouse 505. In the exemplary embodiment of FIG. 5, personally identifiable information will remain stored in the data warehouses 555, 585 of each province.

The system 500 receives incoming records from a customer system 540 that includes a matching service client 545. A central control server 510 receives the incoming records, and then stores the incoming records in a request table. Once the request table is populated, an enterprise matching service 525 then sends the records in the request table to a second server 520 having a Java application, which cleanses the records according to any of the methods described above. The second server 520 then generates match codes according to any of the methods described above. The second server 520 may be a DataFlux server in an exemplary embodiment.

The match codes are compared to pre-generated match codes collected in the central data warehouse 505 according to any of the matching strategies described above. Upon identifying one or more potential matches, the system 500 then calculates a weightage based on scores of the potential matches. As described above, records with scores exceeding a set threshold may then all be output to the customer as matches, or the system 500 may be configured to match the incoming record to the database record with the highest score. If no potential matches are identified during the matching strategies, or none of the potential matches met or exceeded the set threshold, then the system 500 outputs no match to the customer. Upon a successful match, the province name and unique student identifier within that province will be provided back by the EMS. Using this information, if the end user has access to province data, the EMS will pull the data from the province's data warehouse and provide it back as a result.

For records stored in a province system 550, 575, incoming records are received by a matching service client 565, 590, cleansed by a third server 560 or a fourth server 580 according to methods described above, match codes generated according to methods described above, and then the match codes compared to second data warehouse 555 or a third data warehouse 585. The third server 560 and the fourth server 580 may be DataFlux servers in an exemplary embodiment. Matching strategies and results are returned in a similar fashion as the methods and systems described above. The efficiency gains described above in Table 2 are realized by, for example, at least the central control server 510 running the enterprise matching service 525. The efficiency gains are due to the significant reduction in computational load and memory needed to perform the matching, as compared to prior art matching engines. Increased efficiencies are also realized, for example, by processing data records as a batch instead of a single data record at a time.

Figure 6:
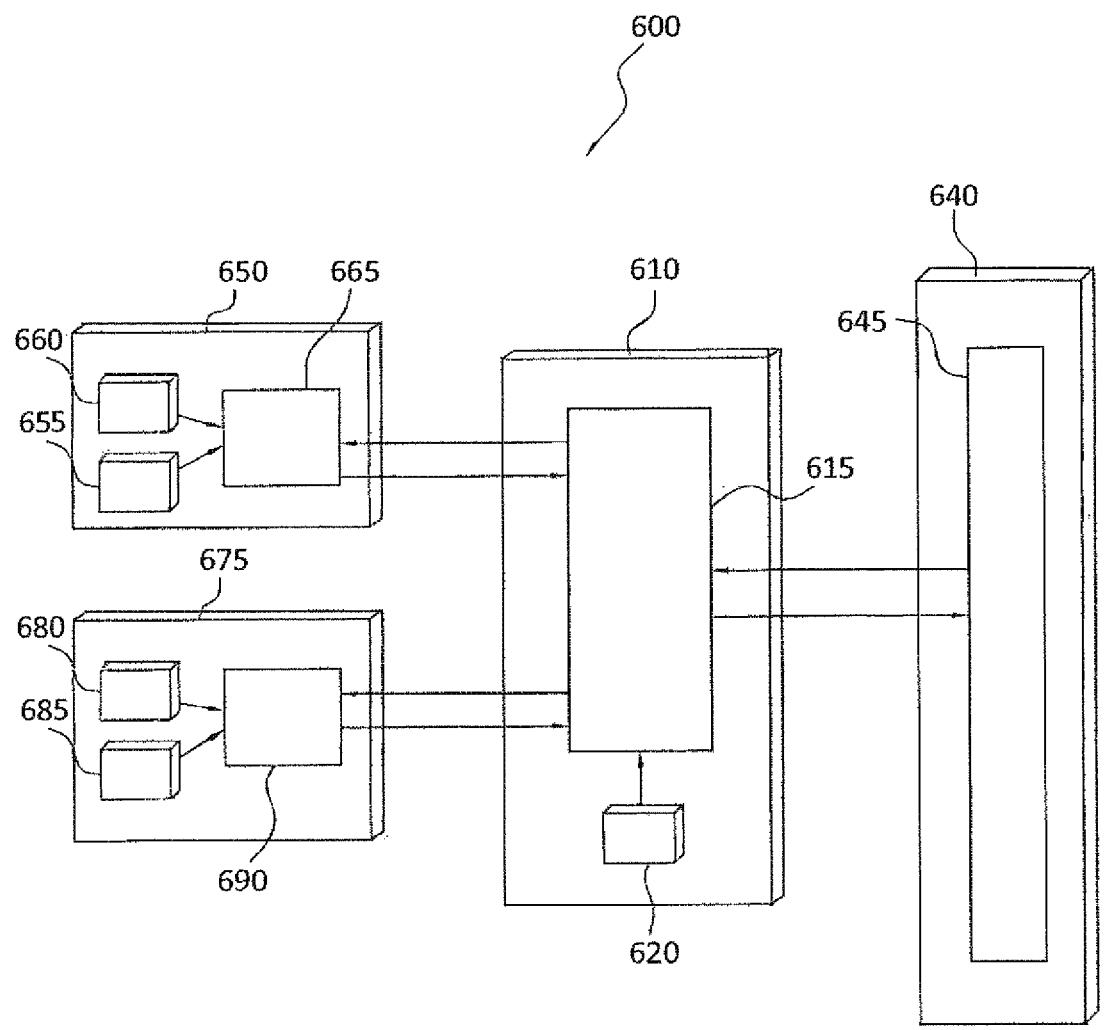
FIG. 6 is a block diagram of a system that implements batch record matching across a plurality of data warehouses, according to another embodiment.

FIG. 6 is a block diagram of a system 600 that implements batch record matching across a plurality of data warehouses, according to another embodiment. The system 600 is similar to the system 500 except that no data is permitted to leave the province in which it resides not even encrypted data.

The system 600 receives incoming records from a customer system 640 that includes a matching service client 645. A central control server 610 receives the incoming records, and then stores the incoming records in a request table. A first second server 620 generates match codes according to any of the methods and systems described above. The second server 620 may be a DataFlux server in an exemplary embodiment. A matching central orchestrating job 615 then sends the generated match codes, as well as several additional data attributes such as province ID and student ID, to a first province system 650 and/or a second province system 675. The first province system 650 includes a first data warehouse 655, third server 660, and a first matching server 665. The second province system 675 includes a second data warehouse 680, a fourth server 685, and a second matching server 690. The third server 660 and the fourth server 680 may be DataFlux servers in an exemplary embodiment.

The matching central orchestrating job 615 stores incoming records in a request table and then sends the records to the first province system 650 and/or the second province system 675. Any additional data attributes are cleansed and match codes generated by the third or fourth server 660, 685. The match codes are compared to second data warehouse 655 or a third data warehouse 685. Matching strategies and results are returned in a similar fashion as the methods and systems described above. The efficiency gains described above in Table 2 are realized by, for example, at least one of the central control server 610, the first matching server 665, and the second matching server 690, due to the significant reduction in computational load and memory needed to perform the matching, as compared to prior art matching engines. Increased efficiencies are also realized, for example, by processing data records as a batch instead of a single data record at a time.

The embodiments described above may additionally be implemented in a single server environment, where the single server performs the functions described in the embodiments above. The server may be similar to any of the servers described above. For example, the server may be an Oracle RAC server having an eight-core CPU. It is understood that a person of ordinary skill in the art could utilize a different server configuration without departing from the spirit or scope of the invention.

The server may comprise a database of records. In another embodiment, the server may be configured to communicate with the database of records.

In an exemplary embodiment, the server is configured to receive incoming data records, store the incoming data records in a request table, cleanse the data records, generate match codes corresponding to the incoming data records, compare the match codes of the incoming data records to predetermined match codes corresponding to the records in the database to identify a subset of potential matches, weigh the records in the subset of potential matches, and identify from the subset of potential matches any record that meets a threshold value.

The server may be configured to perform the sequential matching strategies described above, and further configured to weigh potential matches according to the weightage node described in the embodiments above. Table 3, illustrated below, displays an example of the efficiency gains made by the EMS implemented on a single Oracle RAC server having an eight-core CPU, over known prior art techniques, for example the prior art described in U.S. Pat. No. 8,676,823 and assigned to National Student Clearinghouse. This example is not intended to limit the scope of the disclosure and is for illustrative purposes only:

TABLE 3

| Attributes | Existing Matching Engine (Prior Art) | New Matching Service (EMS) (Single Server) |
| --- | --- | --- |
| BATCH_ID | 345 | 3141 |
| BATCH_TOTAL | 200000 | 250000 |
| ELAPSED_MINUTES | 91 | 10 |
| RECS_PER_SECOND | 36 | 416 |
| SINGLE_MATCH_CNT | 144285 | 234401 |
| NO_MATCH_CNT | 55656 | 1156 |
| MULTIPLE_MATCH_CNT | 58 | 14443 |
| MATCH_PERCENT | 72.1425 | 93.7604 |
| NO_MATCH_PERCENT | 27.828 | 0.4624 |
| Multiple Match Percent | 0.029 | 5.7772 |

As illustrated in Table 3, the single server embodiment of the EMS of the present disclosure batch matched 250,000 records more than nine times faster than the prior art matching engine matched 200,000 records. As can be seen in the RECS PER SECOND row, the single server embodiment matched records more than eleven times faster than the prior art matching engine described in U.S. Pat. No. 8,676,823. Furthermore, the EMS of the present disclosure is more accurate than the prior art matching engine, with a much higher match percent and minimal no match percent.

The above description and drawings illustrate preferred embodiments which achieve the objects, features, and advantages of the present invention. Although certain advantages and preferred embodiments have been described above, those skilled in the art will recognize that substitutions, additions, deletions, modifications and/or other changes may be made without departing from the spirit or scope of the invention. Accordingly, the invention is not limited by the foregoing description but is only limited by the scope of the claims in any subsequent non-provisional application claiming priority hereto.

What is claimed as new and desired to be protected by Letters Patent of the United States is:

1. A system for improved efficiency of batch processing of incoming data records, the system comprising:
   at least one server; and
   a database of records;
   wherein the at least one server is configured to:
      receive incoming data records, each data record containing a plurality of attributes;
      store the incoming data records in a request table;
      cleanse the incoming data records;
      generate a plurality of match codes associated with the plurality of attributes for each of the incoming data records; and compare one of the match codes (in a match code step) of each of the incoming data records to a predetermined corresponding match code of the records in the database, to identify a subset of potential matches for the incoming data record, wherein the subset of potential matches is fewer than all of the database of records, if a subset of potential matches is identified in the match code step, the at least one server is further configured (in a weightage node step) to compare a plurality of attributes of the incoming data record to a corresponding plurality of attributes of the subset of potential matches, weigh the records in the subset of potential matches, wherein weighing the records comprises:

assigning a plurality of attributes of the incoming data record between a plurality of attribute categories;

comparing a plurality of attributes of the incoming data record to the subset of potential matches identified in the match code step;

returning a weighted value associated with each of the plurality of attribute categories if at least one of the plurality of attributes of the incoming data record matches or mismatches the subset of potential matches identified in the match code step;

summing the weighted values; and comparing the sum of the weighted values to a selected threshold value; and identifying, from the subset of potential matches, data records that meet the threshold value, if a subset of potential matches is not identified in the first match code step or no data records meet the threshold value in the weightage node step, the at least one server is further configured to repeat the match code step (a second match code step) for a second match code different than the first match code and to repeat the weightage node step (a second weightage node step) for the subset of potential matches identified in the second match code step.

2. The system of claim 1, wherein the at least one server is further configured to:

if a subset of potential matches is not identified in the second match code step or no data records meet the threshold value in the second weightage node step, repeat the match code step (a third match code step) for a third match code different than the first and second match codes and to repeat the weightage node step (a third weightage node step) for the subset of potential matches identified in the third match code step.

3. The system of claim 2, wherein the at least one server is further configured to:

if a subset of potential matches is not identified in the third match code step or no data records meet the threshold value in the third weightage node step, repeat the match code step (a fourth match code step) for a fourth match code different than the first, second, and third match codes and to repeat the weightage node step (a fourth weightage node step) for a subset of potential matches identified in the fourth match code step.

4. The system of claim 3, wherein the at least one server is further configured to:

if a subset of potential matches is not identified in the fourth match code step or no data records meet the threshold value in the fourth weightage node step, repeat the match code step (a fifth match code step) for a fifth match code different than the first, second, third, and fourth match codes and to repeat the weightage node step (a fifth weightage node step) for a subset of potential matches identified in the fifth match code step.

5. The system of claim 4, wherein the at least one server is further configured to:

if a subset of potential matches is not identified in the fifth match code step or no data records meet the threshold value in the fifth weightage node step, repeat the match code step (a sixth match code step) for a sixth match code different than the first, second, third, fourth, and fifth match codes and to repeat the weightage node step (a sixth weightage node step) for a subset of potential matches identified in the sixth match code step.

6. The system of claim 5, wherein the at least server is further configured to return no matches when the match steps returns no potential matches.

7. The system of claim 1, wherein when one data record meets the threshold value in the weightage node step, the at least one server returns a match.

8. The system of claim 1, wherein when a plurality of data records meet the threshold value in the weightage node step, the at least one server returns all of the plurality of data records as matches.

9. The system of claim 1, wherein when a plurality of data records meet the threshold value in the weightage node step, the at least one server returns a highest-scored record as a match.

10. The system of claim 1, wherein each attribute category has a different weighted value for a match and a mismatch of an attribute within the category.

11. The system of claim 1, wherein the plurality of attributes are selected from the group consisting of: a social security number, a previous social security number, a student ID number, a student profile token, a first name, a last name, a date of birth, a middle name or initial, an address, and a school code.

12. The system of claim 10, wherein each of the plurality of attribute categories comprises a plurality of attributes.

13. The system of claim 1, wherein the system further comprises:

a second server, wherein the second server is configured to:

receive the request table from the first server;

cleanse the incoming data records in the request table; and generate a plurality of match codes for each of the incoming data records.

14. The system of claim 13, wherein the system further comprises:

a third server, wherein the third server is configured to perform the steps of:

comparing the match codes of the incoming data records to predetermined match codes of the records in the database by utilizing a series of sequential matching strategies to identify a subset of potential matches;

weighing the records in the subset of potential matches; and identifying from the subset of potential matches any record that meets a threshold value.

15. A method of processing records, comprising:

storing, at a server, a plurality data records in a request table;

generating, at a server, a plurality of match codes for each of the plurality of data records in the request table;

comparing, at a server, the match codes of the data records in the request table to predetermined match codes of a plurality of records in a database by utilizing a series of sequential matching strategies to identify a subset of potential matches;

wherein the series of sequential matching strategies increases an efficiency of a server by comparing one match code at a time to match codes of the plurality of records in the database to identify a subset of potential matches, wherein the series of sequential matching strategies further comprises:

comparing a first match code to the database of records to identify a subset of potential matches;

proceeding to a subsequent search strategy when comparing a first match code returns no potential matches; and comparing a second match code to the database of records to identify a subset of potential matches;

weighing, at a server, the records in the subset of potential matches, wherein weighing the records comprises:

comparing a plurality of attributes of the incoming data record to the subset of potential matches;

returning a weighted value associated with each of the plurality of attributes;

summing the weighted values; and comparing the sum of the weighted values to a threshold value; and identifying, at a server, from the subset of potential matches data records that meet the threshold value, wherein comparing a plurality of attributes of the incoming data record to the subset of potential matches increases efficiency of the at least one server by reducing a total number of data records that the plurality of attributes are compared to; and wherein comparing a plurality of attributes, returning a weighted value, summing the weighted value, and comparing the weighted value to the threshold value increases the accuracy of the at least one server by permitting the subset of potential matches to be evaluated according to the plurality of attributes.

* * * * *